United States Patent [19]

Livingston et al.

[11] Patent Number: 4,813,163
[45] Date of Patent: Mar. 21, 1989

[54] ALIGNMENT FITTING FOR ATTACHING IMPLEMENTS TO A BACKHOE

[75] Inventors: Johnston R. Livingston, Denver; Paul T. St. Louis, Littleton, both of Colo.

[73] Assignee: Construction Technology, Inc., Denver, Colo.

[21] Appl. No.: 148,439

[22] Filed: Jan. 26, 1988

[51] Int. Cl.$^4$ .............................................. E02F 5/02
[52] U.S. Cl. ....................................... 37/103; 414/723; 74/568 R; 74/571 R; 384/255; 403/405.1; 403/407.1; 403/365; 403/316
[58] Field of Search ................ 37/103, 117.5, DIG. 3; 414/586, 723; 384/255, 901; 403/4, 316–317, 405.1, 407.1, 365; 74/571 R, 571 Z, 571 M, 568 R

[56] References Cited

U.S. PATENT DOCUMENTS

| | | |
|---|---|---|
| 1,565,264 | 2/1925 | Dubi . |
| 1,571,557 | 2/1926 | Paul . |
| 2,159,348 | 5/1939 | Austin . |
| 2,859,058 | 11/1958 | Traugott . |
| 2,895,236 | 7/1959 | Pilch ................................. 37/103 X |
| 3,120,281 | 2/1964 | Peveler et al. . |
| 3,385,624 | 5/1968 | Baclini . |
| 3,778,174 | 12/1973 | Molby ................................. 403/365 |
| 4,100,688 | 7/1978 | Grist ................................. 37/DIG. 3 |
| 4,214,840 | 7/1980 | Beales ................................. 37/103 |
| 4,295,287 | 10/1981 | Watzke et al. ................... 37/103 |
| 4,407,198 | 10/1983 | Simeth ................................. 101/247 |
| 4,626,047 | 2/1986 | Miciukiewicz . |

FOREIGN PATENT DOCUMENTS

WO85/0440 10/1985 World Int. Prop. O. .

OTHER PUBLICATIONS

Ser. No. 895,808, 7/86, St. Louis.

Primary Examiner—Eugene H. Eickholt
Attorney, Agent, or Firm—Gunn, Lee & Jackson

[57] ABSTRACT

An alignment fitting for implements such as buckets and hammers, which are to be removably attached to a bachhoe. The invention includes a pair of cylindrical bosses, which are affixed to opposing apertures in mounting flanges on the implement. A cylindrical bushing is rotatable inside each boss. A pin is placed through an eccentric bore in each bushing, and through the backhoe dipperstick. The eccentricity of the bushings allows the bushings to compensate for misalignment that may occur in the implement or the backhoe dipperstick. The invention may also be used with a hitch to provide greater tolerances when nonstandard size implements are attached.

6 Claims, 3 Drawing Sheets

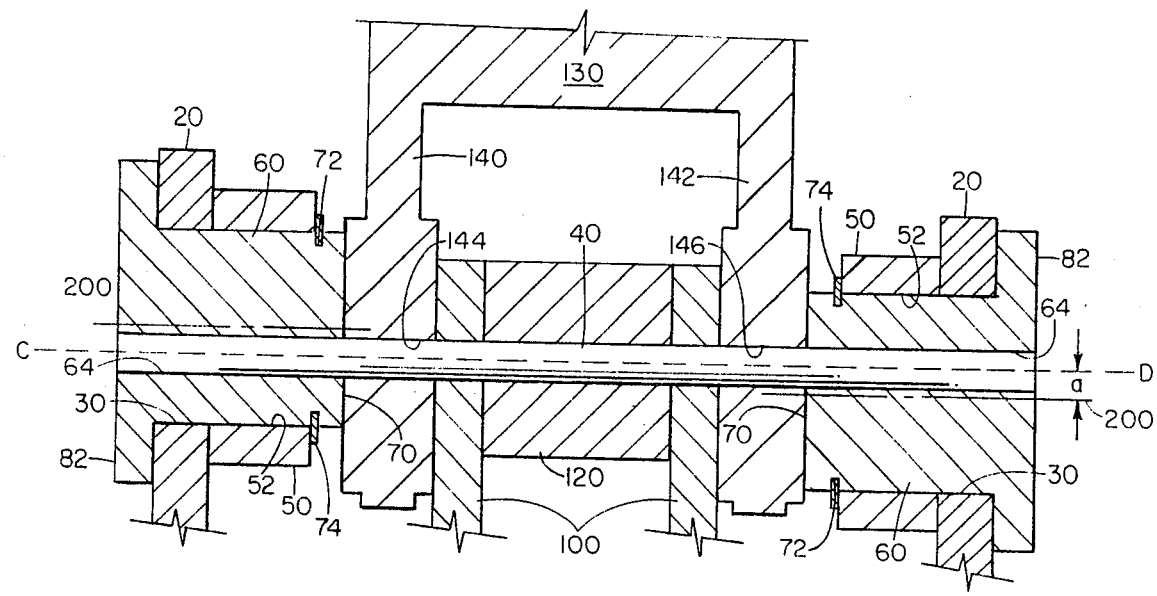
FIG. 4
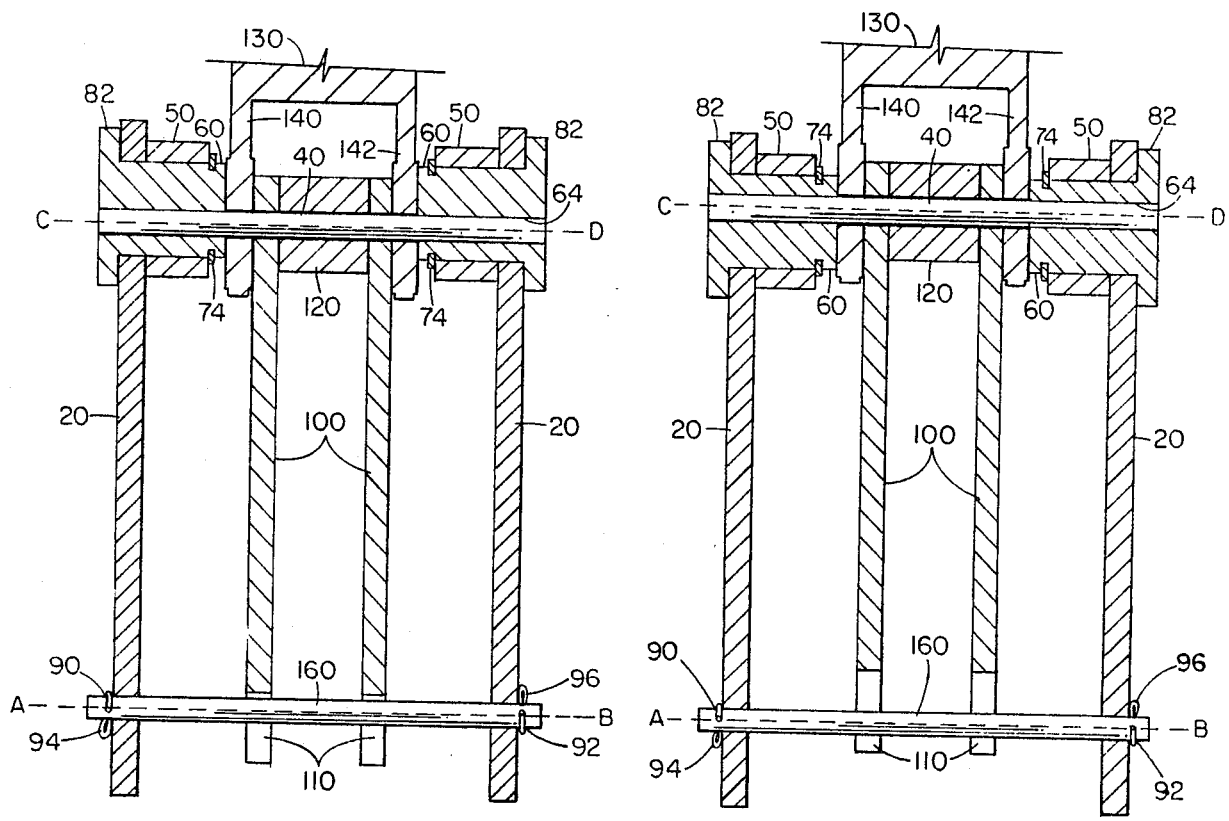
FIG. 5A
FIG. 5B

ALIGNMENT FITTING FOR ATTACHING IMPLEMENTS TO A BACKHOE

BACKGROUND OF THE INVENTION

This invention relates to a means for attaching implements such as buckets and hammers to a backhoe or similar earth-working machinery. Typically, with such machinery, a dipperstick and a linkage arm connect and control the implement. The implement may be attached directly to the dipperstick and linkage arm or it may be attached by means of a hitch.

Attachment directly to the dipperstick and linkage arm is accomplished with a pair of removable pins. Each pin is manually inserted through a pair of opposing apertures in mounting flanges on the implement and through openings at the end of the dipperstick and at the end of the linkage arm.

Attachment by means of a hitch requires only one pin to be removably inserted. The hitch is an interface between the implement and the dipperstick arm, its top side being affixed at two points to the dipperstick and linkage arm. The bottom of the hitch has a hooked jaw at one end and a hollow sleeve at a second end. On the implement, a first pin is affixed between a first pair of opposing apertures. During attachment, the hooked jaw is remotely moved to engage this first pin. The hitch is then manipulated so that the second pair of opposing apertures on the implement is aligned with the hollow sleeve at the second end of the hitch. The second pin is inserted through these apertures and through the hollow sleeve. Thus, there are four points of attachment.

A particular type of hitch is embodied by a coupler manufactured by the J. I. Case Company. The coupler is similar to the typical hitch described above, except that the second end of the hitch attaches at the same place as the dipperstick and the implement. It can be thought of as a "three point" hitch. To achieve the third point of attachment, the second pair of opposing apertures in the implement must be aligned with both the hitch and the dipperstick before the second pin can be inserted through them.

Construction machinery such as backhoes is heavy and rugged, and any implements for this type of equipment must also be heavy and rugged. Being of large size and of heavy material, such equipment is difficult to manipulate, assemble and adjust. The uses to which this type of equipment is put contributes to difficulty in attaching, adjusting, and manipulating implements.

As explained above, both the direct method and the hitch method of attachment require two pairs of opposing apertures in mounting flanges on the implement. Depending on the method used, pins through these apertures must be inserted through whatever is being connected. Specifically, hollow sleeves, bosses, or jaws on the dipperstick, the linkage arm, or the hitch must be in alignment.

It is easy to see how the implement, the dipperstick, the linkage arm, or the hitch may become bent or be otherwise distorted through manufacturing error, damage, misuse, or uneven wear. This will destroy the alignment of the attachment means. Thus, improper alignment of parts through which a pin must pass is one parameter that inhibits attachment and removal of various implements.

When a hitch is used, there is another parameter that is critical to implement attachment and removal. This parameter is the relationship of two distances: (1) the distance between the jaw and hollow sleeve of the coupler, and (2) the distance between the two pairs of opposing apertures in the implement. Because hitches and implements are not always standard in size, these distances may not match. The result is that the hitch and the implement cannot be aligned to permit insertion of the second pin.

As a result of these two types of misalignment, pins must often be strenuously hammered in and out, resulting in damage to the pins themselves or to the implements, the dipperstick, or the linkage arm, or the hitch if one is used. Another result of misalignment is the use of shims, which are not secure and may contribute further to uneven wear. To avoid these problems, this invention uses a pair of eccentrically-bored fittings, which are permanently mounted inside opposing apertures on the implement.

Eccentricity is defined as the distance of the geometric center of a revolving body from the axis of rotation. In general, eccentrically-bored sleeves can be used to compensate for misalignment when a shaft of one piece of equipment must be received into a hole in another piece of equipment. Rotating an eccentric sleeve is desirable when it is difficult to move the equipment itself. This general application of rotatable eccentric sleeves is demonstrated by U.S. Pat. No. 3,385,624. This patent discloses an adjusting device used to align a bolt of a door into a socket of a door frame.

Eccentricity is used with cams to adjust rotation to translation movement. In an eccentric cam, the shaft is displaced from the geometric center. In U.S. Pat. No. 4,626,047, an eccentric sleeve in a cam is used to adjust the cam so that two pieces of equipment may be latched together. U.S. Pat. No. 3,120,281 discloses an eccentric cam used to adjust a ripper tooth attached to a front loader. Eccentrically-bored sleeves have been used in shaft bearings to adjust the throw of the shaft. In U.S. Pat. No. 1,565,264, such sleeves are mounted in a shaft bearing and are manually rotated relative to each other.

Eccentricity has been used in bushings to adjust distances and angles between two machine parts. In U.S. Pat. No. 2,159,348, a square bushing with an eccentric bore may be removed and reinserted in different positions to vary the angle of an earth moving blade. In U.S. Pat. No. 2,859,058, a bushing having an eccentrically-positioned bore is used in a connection between two machine parts. The bushing is manually rotated to adjust the distance between the centers of two parts.

Eccentrically-bored sleeves have also been used in shaft bearings. In U.S. Pat. No. 1,571,557, two eccentric sleeves are mounted in a journal bearing. The sleeves may be manually rotated relative to each other to align the shaft.

Eccentric bores in a backhoe hitch are described in two pending patent applications. International Publication No. WO 85/0440 and U.S. Ser. No. 895,808 disclose an assembly in a hitch. A pin is inserted through a single elongated bore, which is eccentric to the bushing. In WO 85/0440, the bushing is rotated with a tool inserted into apertures in the bushing. In U.S. Pat. Ser. No. 895,808, the bushing is freely rotatable and adjusts by means of a specially-designed pin.

OBJECTS OF THE INVENTION

An object of the invention is to provide a means for alignment while attaching an implement such as a bucket, hammer, compactor, or ripper to a backhoe.

A further object of the invention is to provide an alignment means that is permanently attached to the implement itself.

Another object of the invention is to provide an alignment means that can be used either with or without a hitch. The invention is useful to attach the implement directly to the dipperstick/linkage assembly of the backhoe, or alternatively, to attach the implement to a backhoe hitch or other coupler device.

An object of the invention is to provide a means for compensating for misalignment of opposing apertures in mounting flanges of a backhoe implement, through which a pin must be inserted for attaching the implement to a backhoe.

A further object of the invention is to compensate for disparity in the distance between a jaw and a pin insertion means in a hitch and the distance between opposing apertures in the implement.

A further object of the invention is to provide an alignment means that can be rotated in a number of different ways. The eccentricity of the fittings can be adjusted manually or with the use of other tools.

BRIEF DESCRIPTION OF THE DRAWINGS

FIG. 4 is a representation of compensation for misalignment of points C and D, as shown in FIG. 3.

FIG. 5 is a representation of minimum and maximum compensation for variations in distances from line AB to line CD and from line AB to the axis of a hollow sleeve hitch, as shown in FIG. 3.

DESCRIPTION OF THE PREFERRED EMBODIMENT

Figure 2:
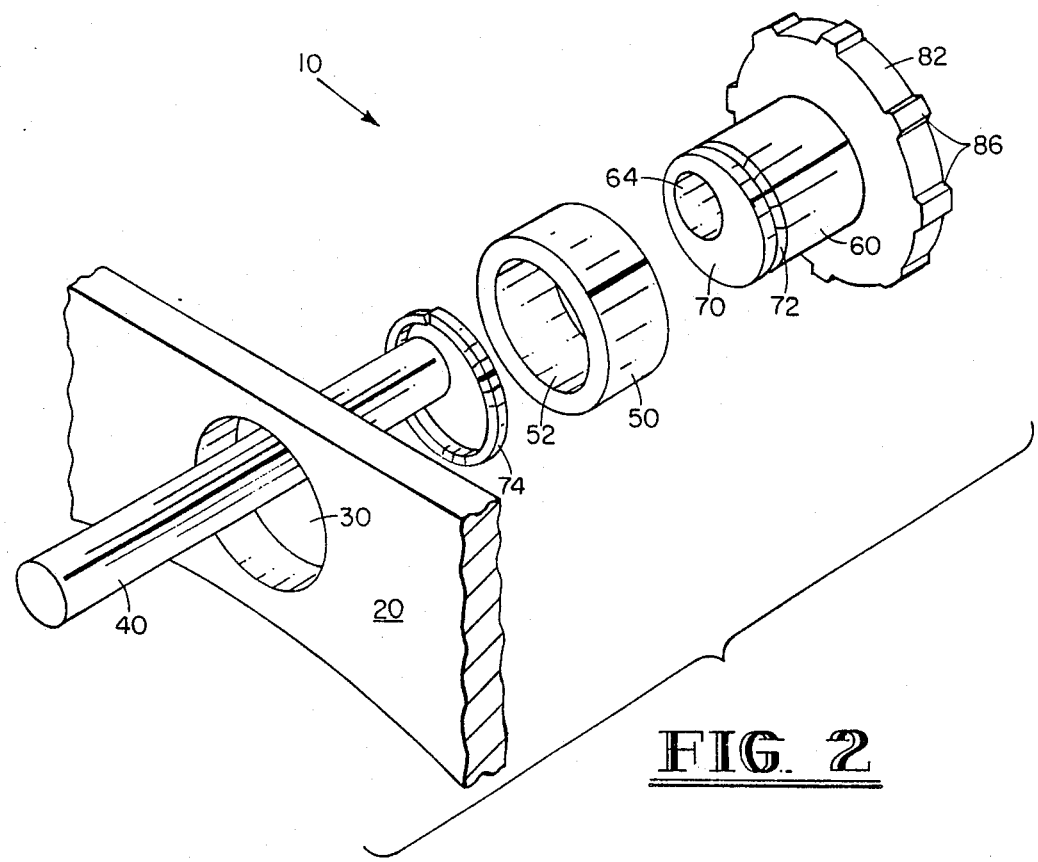
FIG. 2 is an exploded view of the invention prior to affixation within the implement.
Figure 1:
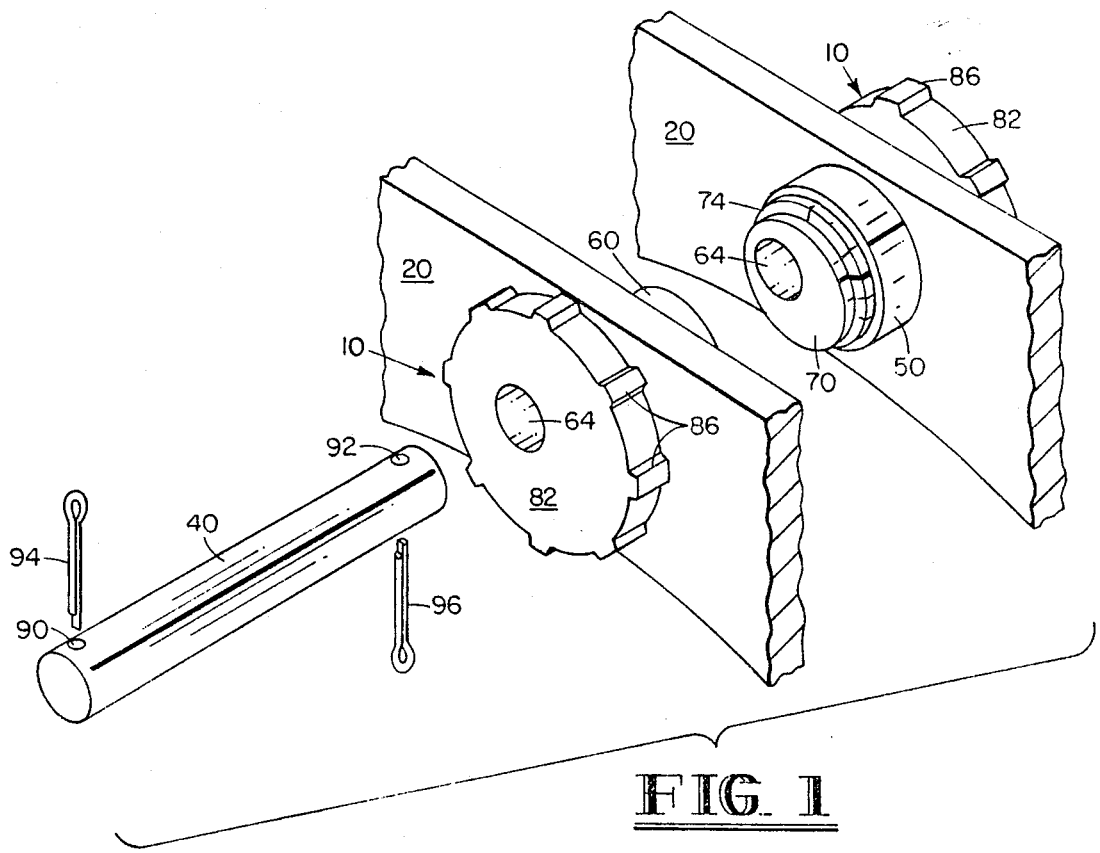
FIG. 1 is an isometric view of the invention, showing the pair of fittings installed in the implement.

Referring to FIG. 1, a pair of alignment fittings is generally designated as 10. One fitting 10 is shown in FIG. 2. The fittings 10 are affixed to mounting flanges 20 of an implement. Each flange has an aperture 30, which is of a diameter appropriate to accommodate the invention.

Figure 3:
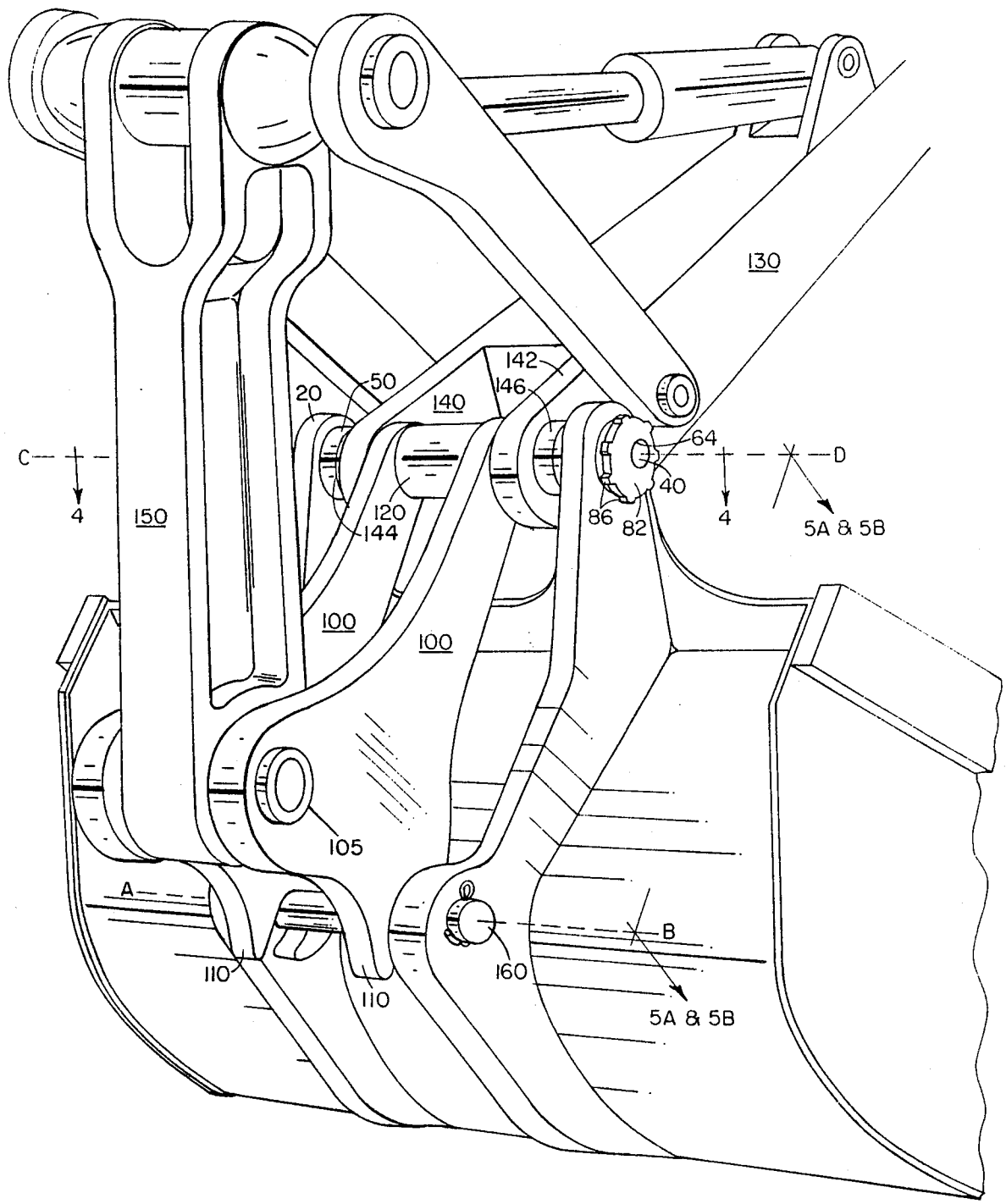
FIG. 3 is an environmental view of the invention as used with a J. I. Case coupler to attach an implement to a backhoe.

The pair of fittings 10 are designed to receive a pin 40. Pin 40 passes through the first fitting, through a hitch and/or a backhoe dipperstick, depending on whether a hitch is used or the type of hitch, and through the second fitting. FIG. 3 shows the invention used in this matter with a coupler manufactured by the J. I. Case Company.

Referring again to FIGS. 1 and 2, each fitting of the pair has the same parts. These parts are made from a rigid, hard material; in the preferred embodiment these parts are steel.

A boss 50 is generally cylindrical in shape. Each boss 50 is affixed inside aperture 30 in mounting flange 20 of the implement. The length of boss 50 is sufficient to allow boss 50 to extend outwardly from each side of mounting flange 20, but not so great as to interfere with placement of the hitch or dipperstick between mounting flanges 20. The outer diameter of boss 50 is only slightly smaller than the inner diameter of aperture 30, so that boss 50 may be firmly and permanently affixed inside aperture 30. In the preferred embodiment, boss 50 is welded inside aperture 30. When the fittings are installed in a typical implement, the outer diameter of boss 50 is approximately 4 inches; its length is approximately 3 inches.

Each boss 50 has a longitudinal bore 52. Bushing 60 is rotatably placed inside bore 52. The outer diameter of the bushing 60 is slightly smaller than the inner diameter of bore 52. The surfaces of the outer diameter of bushing 60 and the inner diameter of bore 52 are smooth. This allows bushing 60 to rotate freely inside boss 50. The length of each bushing 60 is greater than the length of boss 50, and is sufficient to allow bushing 60 to extend outwardly from boss 50 on both sides of mounting flange 20, but not so large as to interfere with placement of the hitch or dipperstick between mounting flanges 20. When the fittings are installed in a typical implement, the outer diameter of bushing 60 is approximately 3 inches inside; its length is approximately 3.5 inches.

A bore 64 extends longitudinally through each bushing 60. Bore 64 is eccentric to the outside surface of bushing 60, and is therefore also eccentric to the bore 52 in boss 50. Bore 64 is of sufficient diameter to permit pin 40 to pass through it, and sufficiently large to allow the circumference of pin 40 to be adequate for strength. When the fittings are installed on a typical implement, pin 40 is approximately 1.75 inches in diameter, with the diameter of bore 64 being approximately 0.010 inches larger.

Near the inside face 70 of each bushing 60, the outside surface of bushing 60 has a groove 72. A retaining ring 74 keeps bushing 60 from sliding out from the bore 52 in boss 50. Other means of retaining bushing 60 in boss 50 are possible, so long as they permit bushings 60 to rotate but not translate. For example, groove 72 on the outer surface could be moved to a location inside boss 50, and a set screw through boss 50 could be centered over groove 72 to retain bushing 60. The inside face 70 of bushing 60 may be chamfered for convenience of insertion within bore 52.

At the outside end 80 of each bushing 60 is a cap 82. Cap 82 is permanently attached to bushing 60 or may be machined as a part of bushing 60. Cap 82 has a bore 84 that is permanently aligned with bore 64 in bushing 60.

The outer circumference of cap 80 has a plurality of ridges 86. Alternatively, the perimeter of cap 80 may be knurled or otherwise shaped to facilitate manual rotation. The diameter of cap 82 is approximately 4.5 inches, which allows it to be manually grasped and rotated.

Pin 40 is of sufficient length to penetrate bore 64 of bushing 60 beyond the outer face of each cap 82. Apertures 90 and 92 at each end of pin 40 permit insertion of cotter pins 94 and 96. The faces of pin 40 may be chamfered to facilitate insertion.

Use of the invention to attach an implement to a backhoe depends on whether a hitch is used, and if so, the type of hitch. In each case, however, the implement has two lines of attachment: front line AB and back line CD. Line AB represents a straight line between the front points of attachment to the implement. Line CD represents a straight line between the center of bores 64. Attachment of the implement requires certain parts to be aligned along these lines.

FIG. 3 shows the invention installed in an implement for use with a J. I. Case Company coupler, herein referred to generically as a hitch. Hitch 100 has a jaw portion 110 at one end and a hollow hitch sleeve 120 at the other. Backhoe dipperstick 130 has two protruding attachment plates 140 and 142, with hollow mounting bosses 144 and 146. Hitch 100 is installed on a linkage arm 150 of a backhoe (not shown) by attachment means 105.

Pin 160 is affixed through opposing apertures at points A and B. Jaw 110 is engaged around fixed pin 160 and settles along line AB. After jaw 110 is so engaged, dipperstick 130 is manipulated to cause apertures 30, hitch sleeve 120, and dipperstick mounting bosses 144 and 146 to come into approximate alignment.

At this time, insertion of pin 40 requires alignment between points C and D. If these points are not in alignment, such that the pin cannot be inserted, one or both of bushings 60 may be rotated. Furthermore, insertion of pin 40 requires the same distance between line AB and line CD as between line AB and the center axis of hollow sleeve 120. If these distances are not the same, bushings 60 may be rotated to equalize them.

FIGS. 4 and 5 show schematically the use of the invention to compensate for misalignment. Because each bushing 60 is rotated independently of the other, the invention can compensate for misalignment of parts between opposing apertures 30. Also, the placement of the eccentric bore can be varied by rotating both bushings 60 together. This provides a greater tolerance for hitches of varying sizes.

For example, if only one fitting is rotated or if the fittings are rotated in opposite directions, the invention will compensate for misalignment of or between opposing apertures 30. The maximum compensation is illustrated in FIG. 4. The maximum alignment along a line for which the invention will compensate is twice the eccentricity of bore 52.

On the other hand, if both fittings are rotated together, the invention will compensate for variations in the distances between line AB and line CD. Thus, the same hitch can be used with different implements, in which the distance between the two pairs of opposing pin apertures may not match those of the hitch. The range of compensation is illustrated in FIGS. 5A and 5B.

Although FIG. 3 shows the use of the invention with a J. I. Case coupler, a second use of the invention is for attaching an implement to a backhoe with a standard hitch. Unlike the J. I. Case coupler, which has three places of attachment, a standard hitch may have four places of attachment. The operation is the same except that pin 40 need only pass through apertures 30 and hitch sleeve 120.

A third use of the invention is for attaching an implement directly to a backhoe without a hitch. In the operation, both pins are manually aligned and inserted, rather than one pin being engaged with a jaw of a hitch. Typically, pin 40 is inserted first. Because of the difficulty of manipulating the implement and the backhoe, pin 40 is the most difficult to insert. It must pass through apertures 30 and dipperstick mounting holes 144 and 146 or a dipperstick sleeve (not shown). Rotation of the eccentric bushings 60 will facilitate attachment by requiring less accuracy by the equipment operator in moving the dipperstick to a proper location between the mounting flanges 20 of the implement.

As shown in FIGS. 4 and 5, the amount of compensation provided by the invention varies with the eccentricity of bore 64 from the center line 200 of bushing 60. Thus, as shown in FIG. 4, if the center line of bore 64 is distance d from center line 200, the maximum compensation for misalignment of a pair of facing flanges 20 is $2 \times d$. As shown in FIGS. 5A and 5B, variations in the distance between line AB and line CD can be decreased distance d or increased distance d, depending on the eccentricity of the bushings 64. If the diameter of bushing 60 is increased, a greater eccentricity is possible. Accordingly, the size of bushing 60, and boss 50 can be increased to permit greater eccentricity and therefore greater adjustability.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description of the invention. It is therefore contemplated that the appended claims will cover such modifications that fall within the true scope of the invention.

I claim:

1. An apparatus to be installed on an implement, such as a bucket or hammer, which is to be attached to heavy machinery, such as a backhoe, comprising:
    a pair of bosses, each of said bosses being in the shape of a cylindrical shell, and having a smooth inner surface;
    a pair of bushings, each of said bushings being generally cylindrical, and having an outer diameter that is slightly smaller than the inner diameter of said bosses, and having a bore that is eccentric to the axis of said bushing;
    a pair of caps affixed to the outer face of said bushings, said caps each having a bore that coincides with said bores in said bushings, and said caps having a means whereby a rotational force may be applied; and
    a pair of means for retaining each of said bushings inside one of said bosses, such that each of said bushings is rotatable inside each respective boss, but is not significantly translatable.

2. The apparatus as recited in claim 1 wherein said bores in said bushings have a smooth inner surface.

3. The apparatus as recited in claim 1 wherein said retaining means is a groove in each of said bushings, said groove being shaped to receive a snap ring.

4. The apparatus as recited in claim 1 wherein said means for rotating said caps is a plurality of teeth on the outer perimeter of said caps.

5. The apparatus as recited in claim 1 wherein the inner faces of said bushings are chamfered.

6. The apparatus as recited in claim 1 wherein said retaining means is a groove in each of said bushings, said groove being located such that when the bushings are placed inside said bosses, said grooves are under said bosses, such that a set screw may be placed through each of said bosses, thereby retaining said bushings inside said bosses.

* * * * *